United States Patent [19]

Takagi et al.

[11] Patent Number: 4,953,591

[45] Date of Patent: Sep. 4, 1990

[54] HYDRAULIC ACCUMULATOR

[75] Inventors: Kiyoharu Takagi, Okazaki; Naoya Tanikawa, Nagoya; Minoru Ikeda, Toyota, all of Japan

[73] Assignee: Aisin Seiki Kabushiki Kaisha, Japan

[21] Appl. No.: 398,974

[22] Filed: Aug. 28, 1989

[30] Foreign Application Priority Data

Aug. 31, 1988 [JP] Japan .............................. 63-114513[U]

[51] Int. Cl.⁵ .............................................. F16L 55/04
[52] U.S. Cl. ........................................ 137/568; 60/413; 138/31
[58] Field of Search .................. 137/568; 60/413, 416; 138/31

[56] References Cited

U.S. PATENT DOCUMENTS

| | | | |
|---|---|---|---|
| 3,208,219 | 9/1965 | Williamson | 60/413 |
| 3,946,760 | 3/1976 | Murakami et al. | 138/31 |
| 3,985,063 | 10/1976 | Lemon | 138/31 X |
| 4,138,846 | 2/1979 | Sakakibara | 138/31 X |
| 4,351,357 | 9/1982 | Orme | 60/413 X |
| 4,685,491 | 8/1987 | Fulmer et al. | 138/31 |
| 4,748,809 | 6/1988 | Sumiya et al. | 60/413 X |
| 4,769,990 | 9/1988 | Bach et al. | 138/31 X |

*Primary Examiner*—John Rivell
*Attorney, Agent, or Firm*—Finnegan, Henderson, Farabow, Garrett & Dunner

[57] ABSTRACT

A hydraulic accumulator for vehicle transmission includes a valve body incorporated into the transmission casing, a piston disposed in a space provided in the valve body and dividing the space into first and second pressure chambers and a cylindrical sleeve member for closing the space. The sleeve member includes a cylindrical portion formed integral with a cover portion for slidable engagement with the piston. The thickness of the cylindrical portion is variable and permits the changing of the effective area difference between the opposite sides of the piston so that desired pressure characteristics can be obtained.

5 Claims, 1 Drawing Sheet

HYDRAULIC ACCUMULATOR

BACKGROUND OF THE INVENTION

1. Field of the Invention:

This invention relates to a hydraulic accumulator and more particularly to hydraulic accumulators used for controlling the oil pressure in automatic transmissions for vehicles.

2. Statement of Prior Art:

Conventional automatic transmissions for automobiles generally include a hydraulic torque converter and a transmission gear mechanism which has a plurality of friction devices such as clutches and brakes for providing a plurality of different driving stages when the friction devices are selectively actuated. A hydraulic accumulator is provided in a hydraulic pressure line connected to each friction device.

One of the conventional hydraulic accumulators is shown in FIG. 2, wherein a piston 2 is slidably disposed in a hollow valve body 1. The piston 2 divides an interior space of the valve body 1 into two chambers, namely, first and second chambers 3, 4. The line pressure is supplied into the two chambers 3, 4 via passages 5, 7, respectively. The numeral 6 designates an orifice provided in the passage 5 leading to a manual valve. Air chamber 8 is provided in the valve body 1 and is always exposed to the atmospheric pressure via port 9. The passage 7 is normally connected to an oil pump or a primary regulator valve.

The valve body 1 has a large diameter cylinder portion 10 and a small diameter cylinder portion 11. The piston 2 is slidable between the two cylinder portions 10, 11. A spring 12 is disposed in the space of the valve body 1 to always bias the piston 2 toward the first chamber 3.

The accumulator provides the hydraulic pressure level in response to position of the manual valve due to the pressure differentials between the first and second chambers 3, 4 and the biasing force of spring 12 towards the piston 2. This conventional accumulator shown in FIG. 2 has the two different diameter cylinder portions 10, 11 as a part of valve body 1. Accordingly, if an adjustment is needed to change the effective area of the piston 2 in order to balance the pressures in the two chambers 3, 4, the valve body 1 has to be altered to change the diameters of the two cylindrical portions 10, 11.

SUMMARY OF THE INVENTION

It is, therefore, an object of the invention to provide an improved hydraulic accumulator which can obviate the above conventional drawbacks.

It is another object of the invention to provide an improved hydraulic accumulator which can vary the hydraulic characteristics of the hydraulic device without changing the shape of the valve body of the accumulator.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purpose of the invention, as embodied and broadly described herein, the improved accumulator of this invention includes a valve body incorporated into a transmission casing and having a cylindrical interior space one end of which is open; a piston slidably disposed in the interior space and dividing the space into first and second pressure chambers; a cylindrical sleeve disposed in the interior space for closing the open end thereof, said cylindrical sleeve including a cover portion for closing the open end of the interior space and a cylindrical portion formed integral with the cover portion for slidable engagement with the piston; and wherein the thickness of the cylindrical portion of the sleeve is variable in accordance with the desired difference in effective areas of the piston in the first and second pressure chambers.

The accompanying drawings, which are incorporated in and constitute a part of this specification, illustrate one embodiment of the invention and, together with the description, serve to explain the objects, advantages and principles of the invention.

BRIEF DESCRIPTION OF THE DRAWINGS

These and other features of the invention will be more apparent with reference to the attached drawings in which.

DETAIL DESCRIPTION OF THE EMBODIMENT

Figure 2:
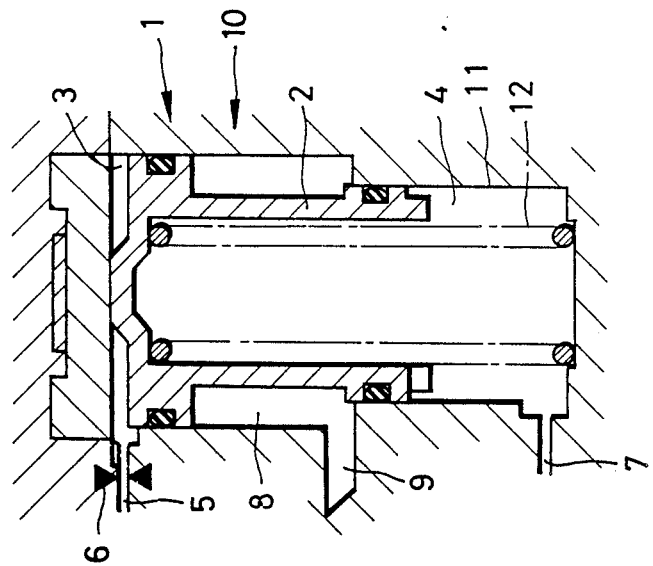
FIG. 2 shows a similar view to FIG. 1 but showing a conventional accumulator.
Figure 1:
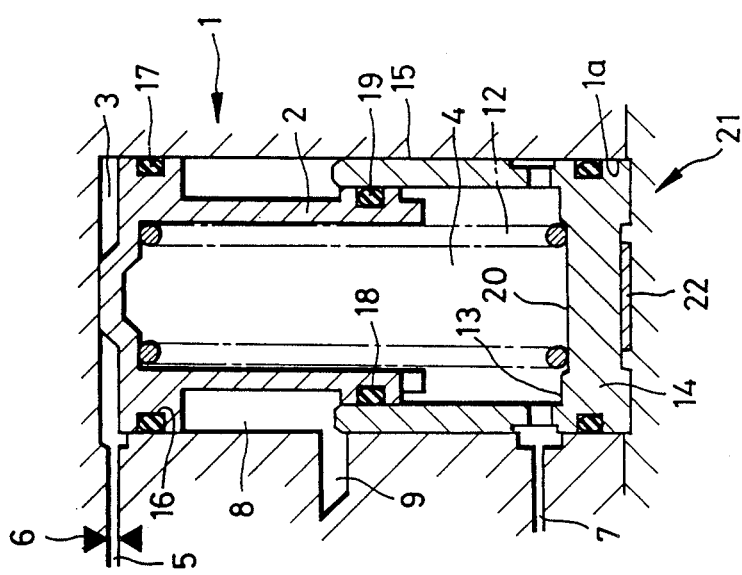
FIG. 1 shows a cross-sectional view of the constructed according to the present invention.

Referring now to the attached drawings, particularly to FIG. 1, a valve body 1 includes a cylindrical space, at one end 1a being open, and in this space is slidably provided a piston 2. The piston 2 defines first and second hydraulic chambers 3 and 4 in the valve body 1. The open end 1a is closed by a sleeve member 13. The sleeve member 13 includes a circular cover portion 14 and a cylindrical portion 15 formed integrally with the cover portion 14.

A first seal member 17 is provided in an annular groove 16 formed on the piston 2 for separating the first pressure chamber 3 from the air chamber 8 in a fluid-tight manner.

The piston 2 is slidably engaged with the inner periphery of the cylindrical portion 15 of sleeve 13. A second seal member 19 is provided in an annular groove 18 on the piston 2 for separating the second pressure chamber 4 from the air chamber 8 in a fluid-tight manner. One surface of the cover portion 14 of sleeve 13 facing the second pressure chamber 4 is provided with a groove or recess 20 for positioning the spring 12. A valve body cover 21 is provided for retaining the sleeve member 13 within the valve body 1. Numeral 22 designates a plate disposed between the sleeve member 13 and the cover 21 to hold the sleeve member 13 in its end-closure position.

The line pressure is introduced through the passage 5 into the first pressure chamber 3 via orifice 6.

Similarly, the line pressure from the oil pump is introduced into the second pressure chamber 4 through the passage 7. Due to the difference in effective area pressure in the two chambers 3 and 4, the pressure applied to one side of the piston 2 in the first pressure chamber 3 is higher than the pressure applied to the other side of the piston 2 in the second pressure chamber 4, and therefore, in such case the piston 2 is likely to be moved toward the second pressure chamber 4 against the biasing force of the spring 12.

The pressure characteristics of the accumulator is determined by the difference in the effective areas for the piston 2 and the force of spring 12.

In order to change the difference in the effective areas of both the chambers 3 and 4, the thickness of the cylindrical portion 15 may be varied instead of changing the cylinder diameter of the valve body as shown in the conventional accumulator.

Thus, it is easy to obtain any desired hydraulic pressure characteristics by just changing the thickness of a cylindrical portion of the cover member.

What we claim is:

1. A hydraulic accumulator for a vehicle transmission comprising:
    a valve body incorporated into a transmission casing and having a cylindrical interior space one end of which is open;
    a piston slidably disposed in the interior space and dividing the space into first and second pressure chambers;
    a cylindrical sleeve disposed in the interior space for closing the open end thereof, said cylindrical sleeve including a cover portion for closing the open end of the interior space and a cylindrical portion formed integral with the cover portion for slidable engagement with the piston; and
    wherein the desired difference in effective areas of the piston in the first and second pressure chambers is variable in accordance with the thickness of the cylindrical portion of the sleeve.

2. A hydraulic accumulator according to claim 1, wherein the effective area of the piston receiving pressure in first pressure chamber is greater than the effective area receiving the pressure in the second pressure chamber.

3. A hydraulic accumulator according to claim 2, further comprising a first passage connecting the first pressure chamber with a pressure controlled device via an orifice, a second passage connecting the second pressure chamber with a pressure controlled device and an air chamber provided between the first and second pressure chambers, said air chamber being exposed to the atmospheric pressure.

4. A hydraulic accumulator according to claim 3, further comprising a spring disposed in the second pressure chamber and being seated on the cover portion of the cylindrical sleeve.

5. A method for adjusting the difference in effective areas of a piston slidably disposed in the cylindrical interior space of a valve body serving as a hydraulic accumulator, comprising the steps of:
    dividing said cylindrical interior space by said piston into first and second pressure chambers, said piston having a first effective area exposed to the pressure in the first pressure chamber and a second effective area exposed to the pressure in the second pressure chamber;
    positioning a cylindrical sleeve in the second pressure chamber, said sleeve providing slidable engagement with the piston when said piston is disposed in the cylindrical interior space; and
    varying the second effective area of the piston in accordance with the thickness of the cylindrical sleeve and thereby the adjustment of the difference in the first and second effective areas.

* * * * *